United States Patent
Giebeler et al.

(10) Patent No.: US 8,963,087 B2
(45) Date of Patent: Feb. 24, 2015

(54) INFRARED LIGHT SENSOR HAVING A HIGH SIGNAL VOLTAGE AND A HIGH SIGNAL/NOISE RATIO

(75) Inventors: Carsten Giebeler, Edinburgh (GB); Jeffrey Wright, East Lothian (GB); Tim Chamberlain, Edinburgh (GB)

(73) Assignee: Pyreos Ltd., Edinburgh (GB)

(*) Notice: Subject to any disclaimer, the term of this patent is extended or adjusted under 35 U.S.C. 154(b) by 685 days.

(21) Appl. No.: 13/264,908

(22) PCT Filed: Apr. 16, 2010

(86) PCT No.: PCT/EP2010/055062
§ 371 (c)(1),
(2), (4) Date: Jan. 17, 2012

(87) PCT Pub. No.: WO2010/119131
PCT Pub. Date: Oct. 21, 2010

(65) Prior Publication Data
US 2012/0132807 A1 May 31, 2012

(30) Foreign Application Priority Data

Apr. 17, 2009 (DE) .......................... 10 2009 017 845

(51) Int. Cl.
*G01J 5/34* (2006.01)
*G01J 5/08* (2006.01)
(52) U.S. Cl.
CPC .... *G01J 5/34* (2013.01); *G01J 5/08* (2013.01); *G01J 5/0846* (2013.01)
USPC ...................................................... 250/338.3
(58) Field of Classification Search
CPC ................. G01J 5/10; G01J 5/28; G01J 5/30; G01J 5/34
USPC ...................................................... 250/338.3
See application file for complete search history.

(56) References Cited

U.S. PATENT DOCUMENTS

| 3,842,276 | A | 10/1974 | Southgate |
| 3,877,308 | A | 4/1975 | Taylor |
| 4,441,023 | A | 4/1984 | Doctor et al. |
| 4,598,163 | A | 7/1986 | Ito |
| 2008/0179525 | A1 | 7/2008 | Ikushima et al. |
| 2008/0315100 | A1 | 12/2008 | Han et al. |
| 2011/0006211 | A1 | 1/2011 | Giebeler et al. |

FOREIGN PATENT DOCUMENTS

| DE | 34 25 377 C2 | 1/1985 |
| DE | 10 2006 057 974 A1 | 6/2008 |
| DE | 10 2007 024 902 A1 | 12/2008 |

*Primary Examiner* — Casey Bryant
(74) *Attorney, Agent, or Firm* — Edell, Shapiro & Finnan, LLC

(57) ABSTRACT

An infrared light sensor for an infrared light detector (1), including a substrate membrane section (2) and at least two sensor chips (7 to 10), which are fastened next to each other on the substrate membrane section (2) and each comprise a layer element (11) which is produced from pyroelectrically sensitive material and is electrically contacted by a base electrode (12) and a head electrode (13) and is arranged in such that there is a voltage difference in each case between the head electrode (13) and the base electrode (12) of each layer element (11) when the layer elements (11) are irradiated with infrared light; and a coupling line (14 to 16) in each case for two adjacently arranged sensor chips (7 to 10), the coupling line coupling the head electrode (13) of the one sensor chip (7 to 9) and the base electrode (12) of the other sensor chip (8 to 10) to each other in an electrically conductive manner so that the layer elements (11) of the sensor chips (7 to 10) are connected in a series circuit, which has one of the base electrodes (17) at one end thereof and one of the head electrodes (18) at the other end thereof, at which a total voltage difference of the series circuit can be tapped as the sum of the individual voltage differences of the layer elements (11).

7 Claims, 1 Drawing Sheet

Detail A

INFRARED LIGHT SENSOR HAVING A HIGH SIGNAL VOLTAGE AND A HIGH SIGNAL/NOISE RATIO

Figure 1:
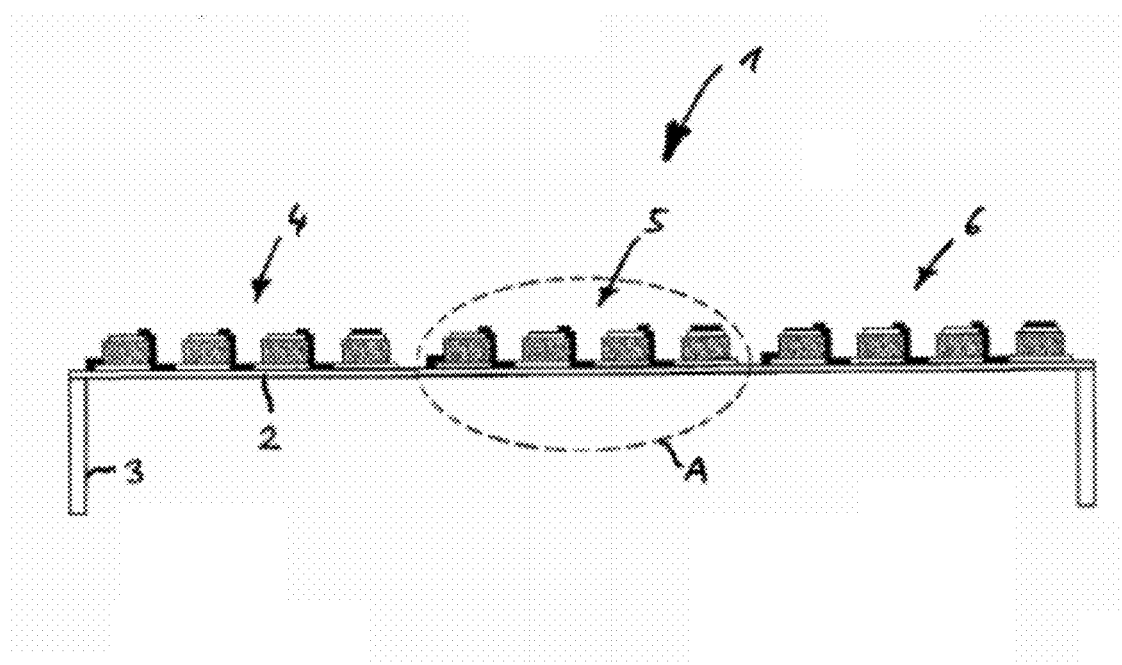

This is a National Stage of Application No. PCT/EP2010/055062 with a filing date of Apr. 16, 2010, and which claims priority to German Patent Application No. 10 2009 017 845.7, with a filing date of Apr. 17, 2009. The entire disclosures of both applications are incorporated herein by reference in their entirety.

The invention concerns an infrared light sensor having high signal voltage and high signal-to-noise ratio, as well as an infrared light detector with the infrared light sensor.

An infrared light detector to detect thermal radiation has, for example, a pyroelectric infrared light sensor in a thin-film design, with two electrode layers and a pyroelectric layer made of pyroelectrically sensitive material arranged between said electrode layers. This material is ferroelectric lead-zirconate-titanate (PZT). The electrode layers comprise platinum or a chromium-nickel alloy absorbing the thermal radiation. The layers are applied with a vapor deposition method. The infrared light sensor is mounted on a substrate membrane that is produced from silicon. An electronic readout component is provided in the infrared light detector to read out, amplify, process and/or relay an electrical signal generated by the infrared light sensor due to thermal radiation. The electronic readout component is realized via the CMOS (complementary metal oxide semiconductor) technique, ASICs or discrete components.

The electronic readout component is conventionally operated in "voltage mode", wherein the electronic readout component has a high impedance. In "voltage mode" operation the signal of the infrared light sensor is in principle independent of the areal extent of the pyroelectric layer. The relative permittivity of the pyroelectric layer of the infrared light sensor is high, whereby the capacitance of the infrared light sensor is also high.

An object of the invention is to achieve an infrared light sensor with high signal voltage and high signal-to-noise ratio, and an infrared light detector that comprises such an infrared light sensor.

An infrared light sensor, according to one formulation of the invention, for an infrared light detector has a substrate membrane segment as well as at least two sensor chips that are attached next to one another on said substrate membrane segment and respectively have a layer element produced from pyroelectrically sensitive material, said layer element is electrically contacted by a base electrode and a head electrode and is set up such that a respective voltage difference is present between the head electrode and the base electrode of each layer element when said layer elements are exposed with infrared light; and a respective coupling line for two adjacently arranged sensor chips, with said coupling line the head electrode of the one sensor chip and the base electrode of the other sensor chip are coupled with one another in an electrically conductive manner so that the layer elements of the sensor chips are connected in a series circuit that has one of the base electrodes at its one end and one of the head electrodes at its other end, at said electrodes a total voltage difference of the series circuit can be tapped as a sum of the individual voltage differences of the layer elements.

According to a further formulation of the invention, an infrared light detector is provided, which has at least one of the infrared light sensors, wherein a substrate membrane of the infrared light detector is formed by the substrate membrane segment, and an electronic readout component for each infrared light sensor whose total voltage difference value can be tapped with the electronic readout component.

According to a further formulation of the invention, the infrared light sensor is formed by the series circuit of the sensor chips so that the total capacitance of the infrared light sensor is the reciprocal sum of the reciprocal individual capacitances of the sensor chips. The total capacitance of the infrared light sensor is thus less than the capacitances of the individual sensor chips, and nevertheless is sufficiently high in order to advantageously interact with the electronic readout component. The total voltage difference of the infrared light sensor is also greater than the individual voltage differences of the sensor chips, namely the sum of the individual voltage differences of the layer elements, such that the high total voltage difference can advantageously be read out with low noise with the electronic readout component given the reduced total capacitance of the infrared light sensor.

The strength of the voltage difference in a "voltage mode" operation of each of the sensor chips is fundamentally independent of the areal extent of the layer element of the respective sensor chip. The sensor chips can thereby advantageously be of small design in terms of their areal extent, for example such that the sum of the surface areas of the layer elements of the sensor chips yields the surface area of a layer element of a conventional sensor chip that is provided as the single sensor chip in a conventional infrared light sensor. A miniaturized design of the sensor chip according to the invention is thereby advantageously enabled so that the extent of the infrared light detector according to the invention does not need to be larger in comparison with a conventional infrared light detector. The total voltage difference and the total capacitance of the infrared light sensor can also advantageously be specifically designed via the corresponding provision of a predetermined number of sensor chips in the infrared light sensor.

The pyroelectrically sensitive material is preferably lead-zirconate-titanate. The layer element is also preferably a thin-film. The thin film is preferably produced with a vapor deposition method, in particular from the group of PVD (physical vapor deposition) and/or CVD (chemical vapor deposition). For example, a vaporization method or sputtering are considered as PVD methods. Pyroelectrically active lead-zirconate-titanate with perovskite structure is thereby formed in the layer elements.

The sensor chips are preferably connected with one another in a thermally conductive manner via the substrate membrane segment and the coupling lines. A thermal cross-talk between the sensor chips is thereby high, whereby the sensor chips react uniformly upon infrared light exposure so that the voltage differences of the sensor chips are optimally essentially the same. Moreover, it is preferred that the total capacitance value of the series circuit corresponds to at least three times the input capacitance value of the electronic readout component. Signal losses caused by the input capacitance of the electronic readout component are thereby advantageously kept to an advantageously low level.

The infrared light sensors are preferably arranged in a grid arrangement on the substrate membrane of the infrared light detector. The infrared light sensors are thereby preferably arranged so as to be thermally insulated from one another. A thermal cross-talk from one of the infrared light sensors to another of the infrared light sensors is thus low, whereby the infrared light detector has a high measurement precision.

According to the invention the infrared light detector is used as a thermal imaging camera, a presence sensor, a motion sensor, a gas detector, a spectroscope and/or a terahertz detector. For example, for the thermal imaging camera the infrared light detector is equipped with the plurality of infrared light sensors such that said infrared light detector has 240×320 infrared light sensors in a grid arrangement.

Figure 2:
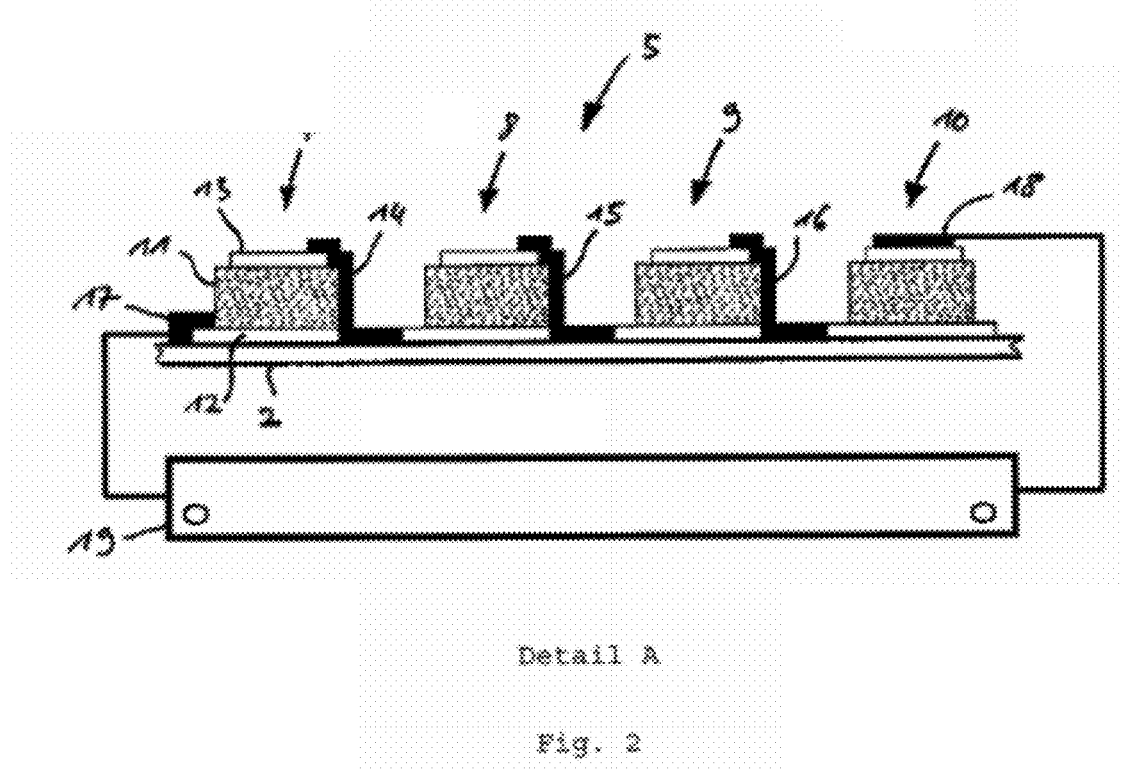

In the following a preferred exemplary embodiment of an infrared light detector according to the invention is explained using the attached schematic drawings in which:

FIG. 1 shows a cross section of the exemplary embodiment of the infrared light detector and, FIG. 2 shows detail A from FIG. 1.

As shown in FIGS. 1 and 2, an infrared light detector 1 has a substrate membrane 2 that is spanned by a support frame 3. A first infrared light sensor 4, a second infrared light sensor 5 and a third infrared light sensor 6 are mounted on the substrate membrane 2. The infrared light sensors 4 through 6 are adapted to detect infrared light, wherein a signal that can be processed by an electronic readout unit is present at the infrared light sensors 4 through 6 depending on the infrared light and the configuration of said infrared light sensors 4 through 6. Each electronic readout component of the unit has an amplifier to amplify the signal of the respective infrared light sensor 4 through 6 and is integrated into the infrared light detector 1.

In the following the second infrared light sensor 5 is described, wherein the same applies to the first infrared light sensor 4 and the third infrared light sensor 6. The second infrared light sensor 5 has a first sensor chip 7, a second sensor chip 8, a third sensor chip 9 and a fourth sensor chip 10. Each of the sensor chips 7 through 10 is formed by a pyroelectric layer element 11 that is formed from pyroelectrically sensitive material, for example lead-zirconate-titanate. Each sensor chip 7 through 10 also has a base electrode 12 that is attached to the substrate membrane 2. The layer element 11 is arranged on the base electrode 12 so that said layer element 11 contacts said base electrode 11. A head electrode 13 is mounted on the layer element 11 so as to be contacting this. The sensor chips 7 through 10 are arranged next to one another in an imaginary straight line on the substrate membrane 2.

The base electrode 12 of each sensor chips 7 through 10 is designed such that it protrudes to one side (to the left in FIGS. 1 and 2) from the layer element 11 so that said base electrode 12 can be contacted from outside the sensor chips 7 through 10. A first coupling line 14 is provided between the first sensor chip 7 and the second sensor chip 8; a second coupling line 15 is provided between the second sensor chip 8 and the third sensor chip 9; and a third coupling line 16 is provided between the third sensor chip 9 and the fourth sensor chip 10. The coupling lines 14 through 16 are designed interchangeably among one another, wherein the first coupling line 14 is described representatively for the coupling lines 15, 16 in the following.

The first coupling line 14 contacts the head electrode 13 of the first sensor chip 7, wherein the coupling line 14 is attached to said head electrode 13. The coupling line 14 is directed past the layer element 11 and the base electrode 12 to the substrate membrane 2, wherein said coupling 1ine 14 contacts neither said layer element 11 nor said base electrode 12. At the substrate membrane 2 the coupling line 14 is directed up to the base electrode of the second sensor chip 8 so that the base electrode of the second sensor chip 8 is contacted by said coupling line 14. An electrically conductive connection is thereby established by the coupling line 14 between the head electrode 13 of the first sensor chip 7 and the base electrode of the second sensor chip 8. The head electrode 13 of the first sensor chip 7 is thus connected in an electrically conductive manner by the first coupling line 14 with the base electrode of the second sensor chip 8. Analogous to this, the head electrode of the second sensor chip 8 is connected in an electrically conductive manner by the second coupling line 15 with the base electrode of the third sensor chip 9, and the head electrode of the third sensor chip 9 is connected in an electrically conductive manner by the third coupling line 16 with the base electrode of the fourth sensor chip 10. The sensor chips 7 through 10 are thereby connected in series by the coupling lines 14 through 16. The one end of the series circuit is formed by the base electrode 12 of the first sensor chip 7, and the other end of the series circuit is formed by the head electrode of the fourth sensor chip 10. To contact the series circuit, a first terminal point 17 is provided at the base electrode of the first sensor chip 7 and a second terminal point 18 is provided at the head electrode of the fourth sensor chip 10.

If the sensor chips 7 through 9 of the second infrared light sensor 5 are exposed with infrared light during operation of the infrared light detector 1, due to a pyroelectric effect a voltage difference is present in the layer elements 11 between the head electrode 13 and the base electrode 12 of each of the sensor chips 7 through 10. In that the sensor chips 7 through 10 are connected with their base electrodes 12 and head electrodes 13 in series by the coupling lines 14 through 16, a total voltage difference is present between the first terminal point 17 and the second terminal point 18 as the sum of the individual voltage differences of the sensor chips 7 through 10. The total voltage difference is tapped by the electronic readout component 19 at the first terminal point 17 and the second terminal point 18 and is processed further. Due to the series circuit of the sensor chips 7 through 10 with the coupling lines 14 through 16, the total capacitance of the infrared light sensors 4 through 6 is also lower than the individual capacitances of the sensor chips 7 through 9. Each electronic readout component that is associated with the corresponding infrared light sensors 4 through 6 is thus provided with a high total voltage difference given a low total capacitance of the infrared light sensors 4 through 6, whereby the signal-to-noise ratio of the infrared light sensor 4 through 6 is increased.

The invention claimed is:

1. An infrared light detector comprising:
   a substrate membrane;
   one or more infrared light sensors, each of the sensors comprising a respective segment of the substrate membrane and at least two sensor chips; and
   one or more electronic readout components, each of the components respectively associated with a given one of the sensors;
   wherein each of the sensor chips comprises:
   (a) a layer element consisting essentially of pyroelectrically sensitive material,
   (b) a base electrode and a head electrode each electrically contacting the layer element and configured such that exposure of at least a part of the layer element to infrared light produces an individual voltage difference between the head electrode and the base electrode, and
   (c) a coupling line,
   wherein the at least two sensor chips are attached physically adjacent one another on the substrate membrane segment and are electrically interconnected in a series circuit by the coupling line such that the head electrode of a first of the sensor chips and the base electrode of a last of the sensor chips are electrically interconnected,
   wherein the series circuit is electrically connected to a respective one of the electronic readout components with one of the base electrodes and with one of the head electrodes, to provide a total voltage difference of the series circuit as a sum of the individual voltage differences of the respective layer elements of the sensor chips for a respective one of the infrared light sensors, and wherein a total capacitance value of the series circuit is at least three times an input capacitance value of a respective one of the electronic readout components.

2. The infrared light detector according to claim 1, wherein the pyroelectrically sensitive material is lead-zirconate-titanate.

3. The infrared light detector according to claim 1, wherein the layer element is a thin film.

4. The infrared light detector according to claim 1, wherein the sensor chips are thermally conductively connected via the substrate membrane segment and the coupling line.

5. The infrared light detector according to claim 1, wherein the infrared light sensors are arranged in a grid arrangement on the substrate membrane.

6. The infrared light detector according to claim 1, wherein the infrared light sensors are arranged so as to be thermally insulated from one another.

7. The infrared light detector according to claim 1, configured to be housed in at least one of a thermal imaging camera, a presence sensor, a motion sensor, a gas detector, a spectroscope and a terahertz detector.

* * * * *